United States Patent Office 3,344,328
Patented Sept. 26, 1967

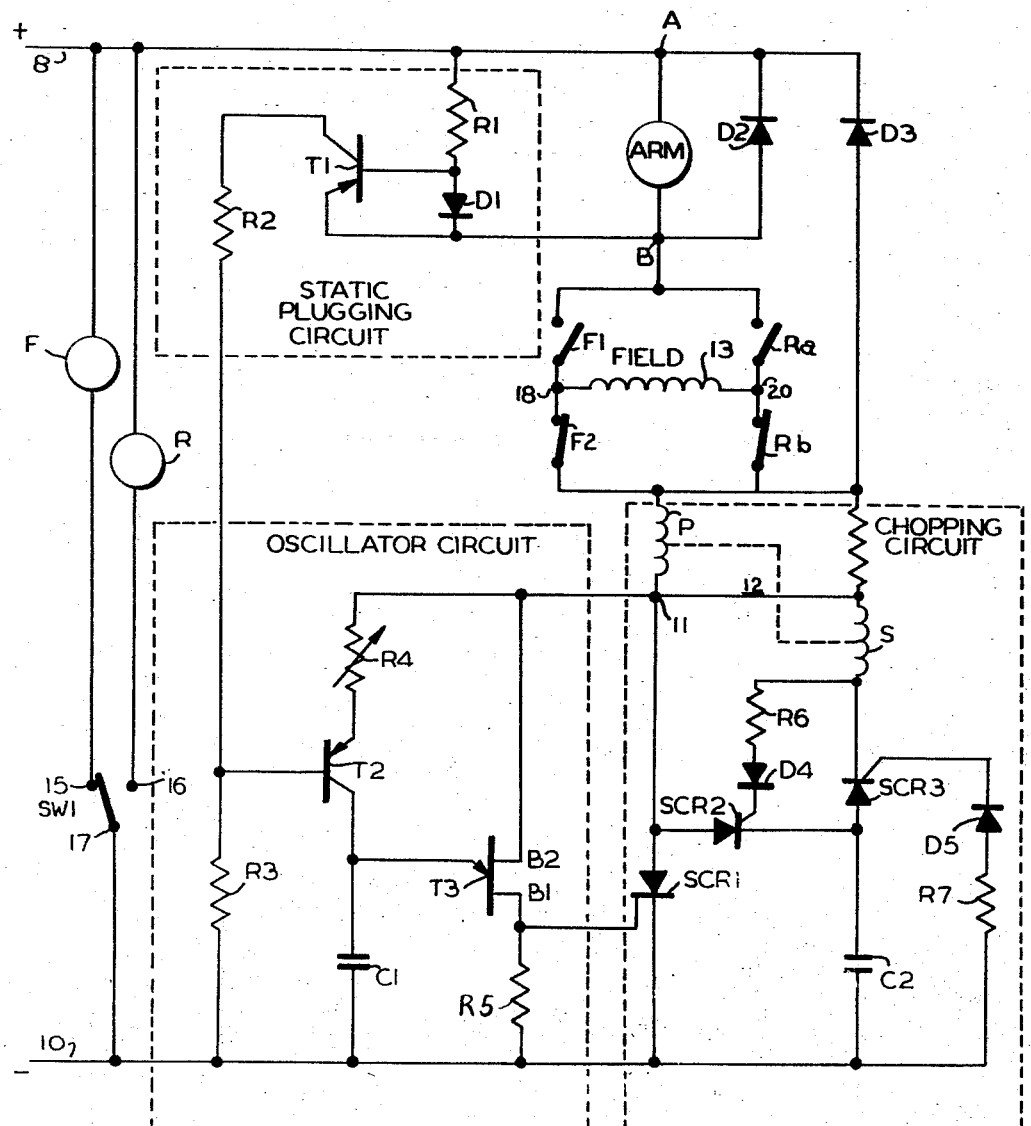

3,344,328
DIRECT CURRENT MOTOR PLUGGING
CIRCUIT
Herbert E. Morris, Roanoke, Va., assignor to General
Electric Company, a corporation of New York
Filed June 11, 1965, Ser. No. 463,156
3 Claims. (Cl. 318—258)

This invention is directed to a circuit for controlling the power to a load, and is particularly adapted to control the acceleration and deceleration of a direct current motor.

The direct current supplied to a load such as a direct current motor from a power source such as a battery or a filtered rectified alternating source may be selectively varied by controlling the average power supplied to the motor. This control circuit may use a solid state controlled rectifier as a power device which may be switched on at selected frequencies into a conducting state to supply power to the direct current motor.

The controlled rectifier normally used is the silicon controlled rectifier which is described in the Silicon Controlled Rectifier Manual, third edition, copyright 1964 by the General Electric Company. A circuit which has been applied to control the power to a direct current motor is described on pages 168–173 of the Silicon Controlled Rectifier Manual. The controlled rectifier is turned on, or fired, to supply power to the load. After the controlled rectifier has been turned on, it remains on until commutating energy is applied to turn the controlled rectifier off. The power applied to the load is determined by the ratio between the time that the controlled rectifier is turned on and the time that the controlled rectifier is turned off. It is important, of course, that the peak current does not approach the lock rotor current which could cause failure of the controlled rectifier and also damage to the motor. This control circuit using a controlled rectifier is often used to control a battery driven direct current motor so that the control circuit should be an efficient circuit.

It is often desirable in controlling direct current motors to engage in dynamic braking or motor plugging. The connections to the motor field are reversed while the motor is coasting so that the motor acts as a generator with the polarity reversed. It is difficult, but important, that the motor is brought to a smooth stop by dynamic braking.

It is therefore an object of this invention to provide a new and improved control circuit using a controlled rectifier for controlling the power from a direct current source, such as a battery to a load, such as a direct current motor.

Another object of this invention is to provide a new and improved control circuit using a controlled rectifier for controlling the power from a direct current source which includes a motor plugging circuit.

Still another object of this invention is to provide a new and improved control circuit using a controlled rectifier for controlling the power from a direct current source to a direct current motor which includes a motor plugging circuit for bringing the direct current motor to a smooth stop.

According to this invention therefore a control circuit is provided for controlling the power from a direct current source to a direct current motor. A controlled rectifier is connected in series with the armature and field of the direct current motor and the direct current source. A firing circuit is provided for firing the controlled rectifier to energize the direct current motor at a predetermined frequency. The controlled rectifier is commutated at a predetermined time after it conducts if the direction of current flow through the field is reversed while the motor is rotating in one direction to drive the armature as a generator.

The signal across the armature is sensed while the motor is driven as a generator. The firing circuit is turned off for a predetermined period of time in response to the signal across the armature and then turned back on to apply another current pulse to the armature of the motor applying reverse torque to the motor. The application of the current pulses to the armature of the motor brings the motor to a smooth stop.

The invention is set forth with particularity in the appended claims. The principles and characteristics of the invention, as well as other objects and advantages, are revealed and discussed through the medium of the illustrative embodiments appearing in the specification and drawing which follows.

The drawing shows an electrical circuit of a static plugging function of a pulse controlled D.C. motor, the circuit having three distinct portions, (1) the oscillator circuit, (2) the chopper circuit, (3) the plugging circuit.

In the drawing the positive line from a D.C. power supply (not shown) is connected to one side of resistor R1, to the motor armature at point A, and to the cathode of diodes D2 and D3. The other side of resistor R1 connects to the base of transistor T1 and to the anode of diode D1. The cathode of diode D1 is the junction point for the armature at point B, the anode of diode D2, and the emitter of transistor T1. Point B is also connected to one side of the normally open contacts of forward contactor F1 and reverse contactor R2. The collector of transistor T1 is connected through resistor R2 to the base of transistor T2 and through resistor R3 to the negative side of the D.C. power supply.

The emitter of transistor T2 connects through adjustable resistor R4 to point 11. The collector of transistor T2 is connected through capacitor C1 to the negative potential and to the emitter of unijunction transistor T3. Base B2 of unijunction transistor T3 is connected to point 11, the junction point of the primary winding P and the secondary winding S of the transformer 12. Point 11 is also connected to the anodes of silicon controlled rectifiers SCR1 and SCR2. Base B1 of unijunction transistor T3 is connected through resistor R5 to the negative potential and to the gate of silicon rectifier SCR1. The negative potential point from the D.C. power supply (not shown) is connected to the cathode of silicon controlled rectifier SCR1. The cathode of silicon controlled rectifier SCR2 is connected to the anode of silicon controlled rectifier SCR3 and through capacitor C2 to the negative potential point. The cathode of silicon controlled rectifier SCR3 connects to secondary winding S of the transformer 12 and through resistor R6 and diode D4, to the gate of silicon controlled rectifier SCR2. The gate of silicon controlled rectifier SCR3 is connected through resistor R7 to the negative potential point 10.

The primary winding P of the transformer is connected to the normally closed contacts of forward contactor F2 and reverse contactor Rb and through diode D3 to the positive potential point 8. The motor field 13 is connected between the junction connection 18 of the normally open F1 and normally closed F2 contacts of the forward contactors and the junction 20 of the normally open Ra and normally closed Rb contacts of the reverse contactor.

Contact 17 of direction switch SW1 connects to the negative potential 10. The coil of the forward contactor F connects to contact 15 and the positive potential point 8. The coil of the reverse contactor R connects to the contact 16 and the positive potential point 8.

The speed of the motor is controlled by a relaxation oscillator which pulses the motor at controlled intervals so that frequency of the pulses determines the speed of the motor.

The speed adjustment consists primarily of a unijunction transistor T3 and an adjustable resistor R4 through which capacitor C1 is charged.

With no emitter current flowing through the unijunction transistor T3, the unijunction transistor T3 in combination with resistor R5 acts as a simple voltage divider. Only a small fraction of the voltage between base B1 and base B2 of unijunction T3 will appear at its emitter. The unijunction transistor is reversed biased.

As capacitor C1 is charged through resistor R4 and transistor T2, potential at the emitter of unijunction transistor rises. When this voltage has reached a value which is greater than the reverse bias, the unijunction transistor turns on. The base B1 of the unijunction transistor T3 now becomes more positive with respect to the negative line. This additional voltage appears at the gate of silicon controlled rectifier SCR1 which now turns on.

With silicon controlled rectifier SCR1 turned on, the current can now pass from point A through the armature, through the forward contactor F1 or the reverse contactor Ra (depending on which is closed), through the series field 13, through the primary windings P of the transformer, and through the silicon controlled rectifier SCR1 to the negative line, causing the motor to run.

When the unijunction transistor T3 is turned on, the capacitor C1 immediately discharges through the emitter of the unijunction transistor T3. The voltage at the emitter consequently drops to a point which is below the bias voltage, and the unijunction transistor T3 turns off, so that the oscillator is ready for the next cycle.

The rate at which the capacitor charges and consequently the frequency of the pulses at the gate of the silicon controlled rectifier SCR1 is dependent on the value of the resistance selected for resistor R4 and determines the speed of the motor.

The capacitor C1 can not recharge as long as the silicon controlled rectifier SCR1 is turned on, since the potential difference between point 11 and the negative line is very small during the ON period. The silicon controlled rectifier SCR1 will stay ON until it is turned off by the chopper circuit.

When the motor is first turned on the current flows through the transformer primary winding P, which causes an induced voltage to flow in the transformer secondary winding S so that the cathode of silicon controlled rectifier SCR3 becomes negative with respect to the negative line. Current now flows through resistor R7 and diode D5 into the gate of silicon controlled rectifier SCR3, causing it to turn on.

With silicon controlled rectifier SCR3 now conducting the transformer secondary winding S draws current away from the capacitor C2, charging it negatively. The transformer secondary S saturates and its magnetic field collapses, causing the cathode of silicon controlled rectifier SCR3 to become positive with respect to capacitor C2. This switches silicon controlled rectifier SCR3 off, and furnishes current through resistor R6 and diode D4 to the gate of silicon controlled rectifier SCR2, which then turns on.

With silicon controlled rectifier SCR2 on, capacitor C2 is placed across silicon controlled rectifier SCR1, thereby turning it off. The capacitor C2 completely discharges and the current through silicon controlled rectifier SCR2 goes to zero, and silicon controlled rectifier SCR2 is turned off. With silicon controlled rectifier SCR1 turned off, full voltage exists across capacitor C2, which will then begin the charging cycle.

The starting time of transformer secondary winding S controls the commutating of the load through silicon controlled rectifier SCR1. This prevents the peak current from reaching a value that can not be commutated by the limited energy stored in capacitor C2. The transformer secondary winding S is saturated at a predetermined value of ampere-milliseconds. At running speeds and light loads, the amperes are lowest, therefore, the time is longest, causing a longer conduction time of load current through silicon controlled rectifier SCR1, resulting in higher motor speeds. As the load increases, the peak current increases and the saturating time of the transformer becomes shorter, preventing the current from rising to as high a value as it would if the time had not changed. This provides ample torque at heavy loads but prevents the peak current from approaching locked rotor current which would cause failure of the silicon controlled rectifier SCR1 and damage the motor.

With the motor running under normal conditions, point B is negative with respect to point A, which causes the potential of the base of transistor T1 to be positive with respect to its emitter, resulting in transistor T1 blocking current. The base of transistor T2 is therefore negative with respect to its emitter, which causes transistor T2 to turn full on, and allows the capacitor C1 to charge.

Switching the direction of the motor is accomplished by energizing either the forward contactor coil F or the reverse contactor coil R, through switching switch SW1 either to contact 15 or 16. The figure shows the connection made through the forward contactor, which closes the normally open contact F1 and simultaneously opens the normally closed contact F2. The current flows from point B, through contact F1, through field 13, through reverse contact Rb and on to the transformer primary P and silicon controller rectifier SCR1. If the reverse contactor coil R is energized by switching switch SW1 over to contact 16, contactor coil F will be de-energized and contact F1 will open and contact R1 will close. Current will now flow in the opposite direction through the field 13.

The motor is brought to a smooth, controlled stop before it reverses when the switch SW1 is transferred from point 15 to point 16. The forward relay coil F is de-energized, and the reverse relay coil R is energized. The forward contacts F1 are closed and the forward contacts F2 are opened. The reverse contacts Ra are closed and the reverse contacts Rb are closed. The motor field 13 is now connected in opposition to the direction of the motor rotation, so that the motor acts as a generator, starting to slow down. Point B now becomes positive with respect to A so that diode D2 short circuits the armature of the motor.

The emitter of transistor T1 is more positive than its base so that it conducts to turn transistor T2 off. With transistor T2 turned off, the relaxation oscillator cannot fire so that the silicon controlled rectifier stays off after it has been turned off by the chopper circuit in the manner described hereinbefore.

The flux in the motor field 13 decays, the armature loses its excitation, and point A becomes positive with respect to point B. This turns off transistor T1 and turns on transistor T2 so that the oscillator again fires the silicon controlled rectifier SCR1 to rebuild the flux in the motor field 13 and apply reverse torque to the motor. The oscillator is again turned off to turn off the silicon controlled rectifier SCR1 in the manner described above until the flux in the motor field 13 decays. Pulses are applied to the motor in the manner described until the motor is brought to a controlled smooth stop where the direction of rotation will be reversed and the motor will rotate with the field connected in the direction of motor rotation.

In summary a new and improved plugging control circuit for a direct current motor has been described. The plugging circuit brings the motor to a smooth controlled stop by reversing the field so that the field is connected in opposition to the direction of the motor rotation. Current pulses are then applied to the motor field to apply reverse torque to the armature to slow the motor down to a stop. After the motor stops, it reverses the direction of rotation.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claims to cover all such modifications as fall within the scope and spirit of the invention.

What is claimed is:

1. A control circuit for selectively varying the power supplied to the armature of a direct current motor through its field winding from a direct current source comprising, a controlled rectifier connected in series with the armature of said direct current motor, a firing circuit for firing said controlled rectifier and energizing said direct current motor at a predetermined frequency, means responsive to the firing of said controlled rectifier for commuting said controlled rectifier at a predetermined time after it conducts, means for reversing the current flow through the field winding of said direct current motor to drive said motor as a generator, means for sensing the signal across the armature of said direct current motor during the time it is driven as a generator, and means responsive to said sensing means for turning off said firing circuit for a predetermined period of time.

2. A control circuit for selectively varying the power supplied to the armature of a direct current motor through its field winding from a direct current source comprising, a controlled rectifier connected in series with the armature of said direct current motor, a firing circuit for firing said controlled rectifier and energizing said direct current motor at a predetermined frequency, means responsive to the firing of said controlled rectifier for commutating said controlled rectifier at a predetermined time after it conducts, means for driving the armature of said direct current motor as a generator, and means responsive to the driving of the armature of said direct current motor as a generator for blocking said firing circuit for a predetermined period of time.

3. A control circuit for selectively varying the power supplied to the armature of a direct current motor through its field winding from a direct current power source comprising, a controlled rectifier connected in series with the armature of said direct current motor, a firing circuit for firing said controlled rectifier and energizing said direct current motor at a predetermined frequency, means responsive to the firing of said controlled rectifier for commutating said controlled rectifier at a predetermined time after it conducts, means for connecting the field winding of said direct current motor in opposition to the direction of motor rotation to drive said motor as a generator, unidirectional conducting means connected across the armature and field winding of said direct current motor to sense the signal developed while the motor is driven as a generator, and a switching circuit responsive to the signal sensed by said sensing means for turning said firing circuit off to de-energize said motor, said switching circuit responsive to said sensing circuit when said motor is de-energized to turn said firing circuit back on.

No references cited.

ORIS L. RADER, *Primary Examiner.*

H. W. COLLINS, *Examiner.*